Nov. 2, 1965  M. L. BENJAMIN ETAL  3,214,773
TAP CHUCK WITH ADJUSTABLE TORQUE RELEASE
Filed Jan. 10, 1963  2 Sheets-Sheet 1
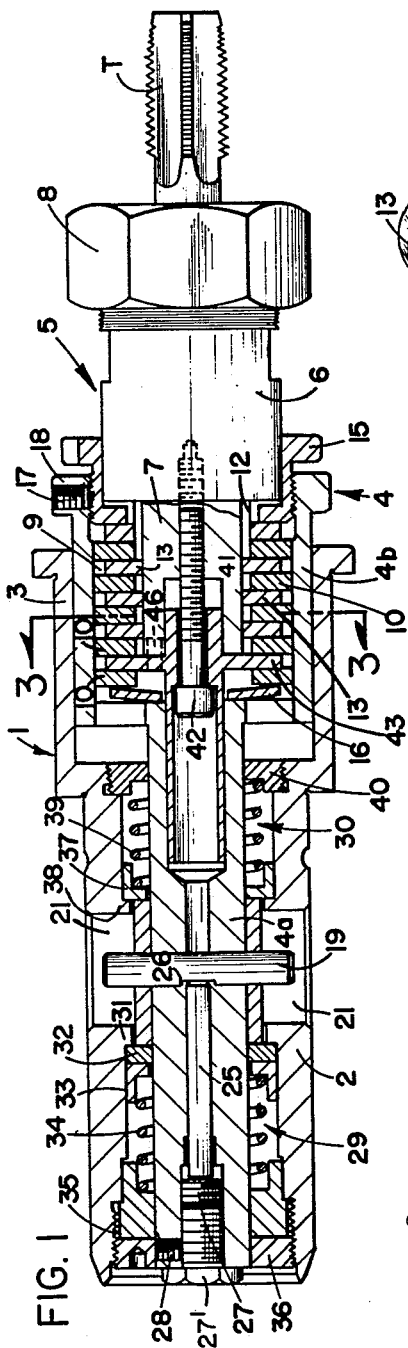
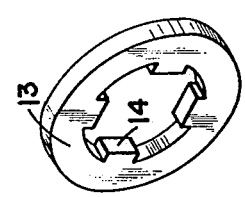
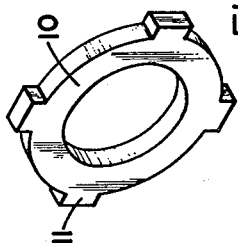
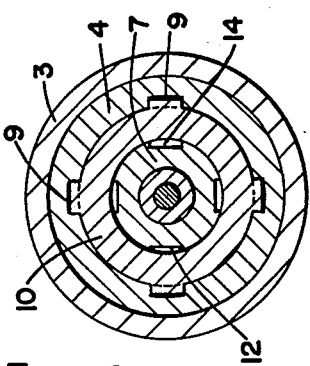
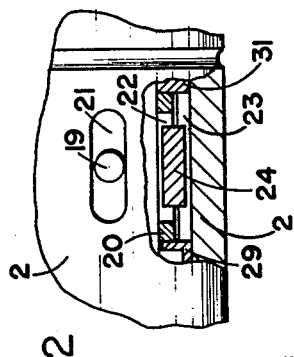
INVENTOR.
MILTON L. BENJAMIN &
GEORGE FREI
BY
Oberlin, Maky & Donnelly
ATTORNEYS Nov. 2, 1965     M. L. BENJAMIN ETAL     3,214,773
TAP CHUCK WITH ADJUSTABLE TORQUE RELEASE
Filed Jan. 10, 1963     2 Sheets-Sheet 2
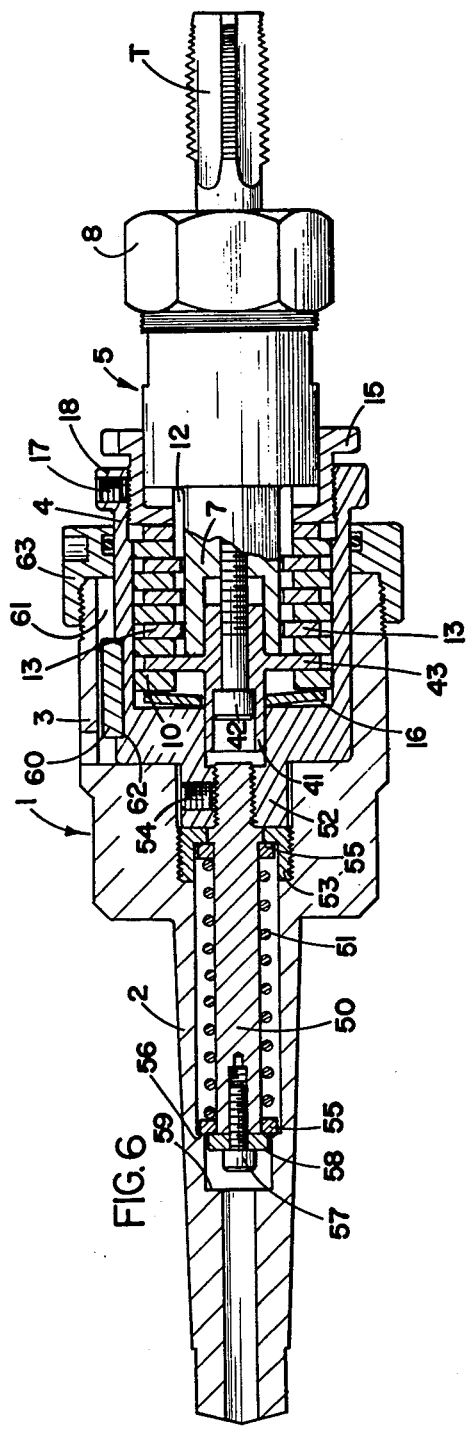
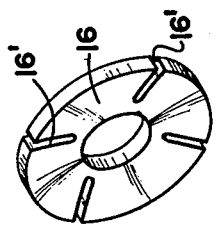
INVENTOR.
MILTON L. BENJAMIN &
GEORGE FREI
BY
Oberlin, Maky & Donnelly
ATTORNEYS United States Patent Office 3,214,773
Patented Nov. 2, 1965

3,214,773
TAP CHUCK WITH ADJUSTABLE TORQUE
RELEASE
Milton L. Benjamin, Shaker Heights, and George Frei, Brecksville, Ohio, assignors to Erickson Tool Company, Solon, Ohio, a corporation of Ohio
Filed Jan. 10, 1963, Ser. No. 250,710
6 Claims. (Cl. 10—135)

This invention relates as indicated to a tap chuck having an adjustable torque release and has for its primary object the provision of an adjustable torque responsive clutch drive mechanism for automatically releasing the drive to the threading tap or like tool when the threading tap or like tool becomes overloaded. Accordingly, a corollary object is to prevent breaking the threading tap by releasing the drive thereto before the tap reaches a point of overloading approximate to the breaking point thereof.

A further object of the invention is to provide a tap chuck for permitting relative axial movement between the tap and the chuck body for accommodating varying axial progression therebetween.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a longitudinal cross-section view of one embodiment of the present invention;

FIG. 2 is a fragmentary, enlarged view of a portion of FIG. 1, showing more clearly the drive connection between the housing and the compensating bushing;

FIG. 3 is a transverse cross-section taken on lines 3—3 of FIG. 1;

FIGS. 4 and 5 are perspective views individually showing the alternately disposed discs of the clutch drive mechanism;

FIG. 6 is a longitudinal cross-section view of a modified form of the present invention; and FIG. 7 is a perspective view of the compression washer forming part of the clutch drive mechanism.

Referring now more particularly to the drawings, wherein like parts are designated by like reference characters, and initially to the preferred form of the invention illustrated in FIG. 1, a chuck body generally indicated at 1 is provided with an elongated smooth shank portion 2 and a forward end portion 3, the shank 2 being adapted to be secured to the tool spindle of a metal working machine. The chuck body has telescoped therewithin a housing member generally indicated at 4 which comprises a relatively small diameter sleeve portion 4a and an enlarged diameter cylindrical outer end portion 4b. The housing 4 is rotatably coupled to the chuck body by means of a keying arrangement to be described below when particular reference is made to FIG. 2, such keying arrangement accommodating relative axial movement between the chuck body 1 and the housing 4. The cylindrical housing portion 4b contains therewithin an adjustable torque release in the form of an adjustable clutch drive mechanism to be further described hereinbelow, such clutch drive mechanism serving to transmit torque from the tool spindle (not shown) through the chuck body 1 to a compensating driver 5 such as is disclosed in U.S. Patent 2,778,648. As clearly disclosed in such patent, the compensating driver 5 is adapted to releasably hold a threading tap T or like tool within a collet (not shown) disposed within the driver 5. The compensating driver further includes a shank portion 6 including a reduced diameter end portion 7 and a clamp nut 8, the clamp nut 8 serving to tighten the collet around the shank of the threading tap T in well-known manner.

Referring now to the clutch drive mechanism for releasably driving the compensating driver 5, the cylindrical housing portion 4b is provided with circumferentially spaced axially extending grooves 9, referring to FIG. 3, formed in the inner periphery thereof. A series of clutch discs 10, FIG. 4, which will be hereinafter referred to as driving discs, are formed with circumferentially spaced teeth 11 adapted to fit into grooves 9, as shown in FIG. 3. As clearly apparent, the driving discs 10 are thus drivingly coupled to the housing 4 whereby rotation of housing 4 will effect rotation of the driving discs 10. The driving discs 10 rotatably receive therewithin the reduced diameter portion 7 of the compensating driver shank 6.

The reduced diameter portion 7 is formed on the periphery thereof with a plurality of circumferentially spaced axially extending grooves 12, such grooves 12 receiving clutch discs 13, FIG. 5, hereinafter referred to as the driven discs. The driven discs 13 are provided on the inner periphery thereof with inwardly extending teeth 14, such teeth being shaped and spaced for disposition in the grooves 12 formed in the end portion 7 of the shank 6. It will thus be apparent that such inner end 7 is coupled to the driven discs 13 for rotation therewith.

Referring back to FIG. 1, the driving discs 10 and driven discs 13 are alternately spaced and to effect rotation of the shank 6 by the housing 4, the driving discs 10 are caused to tightly frictionally contact the driven discs 13 by means of an adjusting nut 15 which is threadedly received in the outer end of the housing 4. Disposed inwardly of the discs 10 and 13 is a dished compression washer 16, FIG. 7, the tightening of the adjusting nut 15 effecting a packing of the alternate discs 10 and 13 between the nut 15 and the washer 16, the latter abutting the end of the sleeve 4a. The washer 16 is formed with radial slots 16' which provide desired resilience for precision torque adjustment throughout the entire range thereof from its initial dish-shaped condition to its flattened condition. In a short distance of adjustment of nut 15 the torque can be precisely varied from zero to maximum.

As should now be apparent, when the adjusting nut 15 is sufficiently tightened, a drive connection or frictional coupling of desired magnitude will be effected from the driving discs 10 to the driven discs 13 due to the above described frictional contact therebetween. When the adjusting nut 15 has been tightened to the desired degree, it can be locked in that position by the set screw 17 which extends through a threaded opening in an annular flange 18 of the housing 4 into contact with the periphery of the adjusting nut 15. Although various materials could of course be employed for the discs 10 and 13, particularly satisfactory results have been obtained through the use of brass driving discs 10 and steel driven discs 13.

The sleeve 4a is axially slidably keyed to the shank 2 of the chuck body by means of pin 19 which extends transversely through aligned openings in the sleeve 4a and in a compensating bushing member 20 into oppositely disposed slots 21 provided in the shank 2. Referring to FIG. 2, the bushing 20 is keyed to shank 2 for rotation therewith, the bushing 20 for such purpose being provided with an elongated slot 22 aligned with a keyway 23 provided in the shank 2, and a drive key 24 is disposed within said slots 22 and 23 to form a drive connection between the shank 2 and bushing 20. The keying arrangement, however, accommodates axial movement of the compensating bushing 20 relative to the shank 2.

It will accordingly be seen that when the compensating bushing 20 is disposed around the sleeve 4a and properly aligned therewith, the pin 19 can be inserted into the position shown in FIG. 1. The pin 19 is held from transverse movement relatively to the sleeve and bushing by means of a release pin 25 adapted to contact the bottom of a depression 26 formed on one side of the pin 19 at approximately the middle thereof. The release pin 25 is maintained in this position by means of a lock screw 27 which is engaged by cap screw 27'. In turn the cap screw 27' is locked by set screw 28.

Since the axial feed rate of the chuck body 1 may be exactly the same as the thread pitch of tap T, the invention provides means for accommodating and controlling relative axial movement between the tap T and the chuck body 1, the latter, of course, being moved to the right, as viewed in FIG. 1, during rotation thereof by the machine spindle. This relative axial movement is, as above described, accommodated by the slots 21 in the shank 2, and is permitted by means of spring assemblies generally indicated at 29 and 30 disposed on either side of the bushing 20. Referring initially to the spring assembly 29, the bore of the shank 2 is provided with an inwardly directed annular flange 31 against which a spacer 32 is seated, such spacer being telescoped around the sleeve 4a. A retainer 33 for one end of spring 34 is disposed adjacent to spacer 32 and in contact therewith. The other end of spring 34 bears on end cap 35 which is threaded into the outer end of the shank 2 and locked therein by locknut 36.

The spring assembly 30 is generally the same as the spring assembly 29, such assembly comprising a spring retainer 37, which abuts flange 38 of the shank 2, a coil spring 39, and a sspring retaining nut 40, the latter being threadedly received in a threaded bore in the forward end portion 3 of the chuck body 1.

The reduced diameter portion 7 of the compensating driver shank 6 is maintained in coaxial alignment with the sleeve 4a by means of an alignment pin 41, which is disposed in openings provided therefor in the inner end of the sleeve 4a and in the oppositely disposed end of the reduced diameter portion 7. The end of the alignment pin 41 adjacent the portion 7 is adapted to receive a cap screw 42 which is screwed into portion 7, whereby alignment between such portion 7 and the sleeve 19 is maintained. The alignment pin 41, which is rotatable relative to the sleeve 4a, is provided with an integral flange 43 keyed to shank 7 by a dowl pin 46 and disposed between two driving discs 10 as shown.

Referring now to the operation of the tap chuck, rotation of the tool spindle is transmitted from the chuck body 1 to the tap T through the clutch drive mechanism comprising the drive and driven discs 10 and 13, respectively, such drive being effected through a tightening of the adjusting nut 15 which in effect couples the housing 4 to the shank 6 holding the tap T. When the threading tap T encounters abnormally high resistance in the workpiece, the torque load overcomes the clutch drive connection thereby providing for relative rotative movement between the chuck body 1, which continues to rotate, and the shank 6, whose rotative movement is momentarily arrested. Such relative rotation is readily discernible to the operator whereupon the tap T can be backed out of the workpiece thereby preventing breakage of the threading tap T. Furthermore, the spring assembly 29 permits continued axial feed of the chuck body 1 even though the tap T has stopped its advance into the workpiece. In this way, shock loads on the spindle feed mechanism (not shown) are avoided.

As before mentioned, the spring assemblies 29 and 30 compensate for any differences in the rates, of axial movement of the chuck body 1 and the tool carrying shank 6. Thus, in the case of the tap T, the axial feed rate of the machine spindle and chuck body 1 need not be equal to the lead of the threads on tap T, since if the tap T is advancing into the workpiece either slower or faster than the axial feed of the chuck body 1, the drive bushing 20 will compress either spring 34 or 39.

Referring now to the form shown in FIG. 6, wherein parts similar to those described in reference to the FIG. 1 form have been designated by like reference characters, the drive clutch assembly housed within cylinder 4 is the same as that previously described and hence further description thereof is not necessary.

In the FIG. 6 form the shank 2 of the tap chuck is shown tapered and is adapted to be seated in the spindle of a machine tool. The bore of the tapered shank 2 has disposed therein a stem 50 which has therearound a coil spring 51. The inner end of the stem 50 is threadedly received in a sleeve 52, the latter being a reduced diameter inner end portion of the housing 4. The shank end of the sleeve 52 abuts a cap member 53 which is threadedly connected to the chuck body 1 as shown. The stem 50 is locked to sleeve 52 by set screw 54. The coil spring 51 engages a pair of spring followers 55, in contact with shoulder 56 and cap member 53 respectively. It will be apparent that spring retaining members or followers 55 additionally function to maintain stem 50 centrally aligned within the shank 2. A cap screw 57 is threadedly received in the outer end of the stem 50 and a washer 58 is disposed therebetween, the latter also serving to contact the left spring retaining member 55 as will be hereinafter described.

The housing 4 is keyed for rotation to the chuck body while providing for relative axial movement therebetween by means of a key 60 which is disposed in slots 61 and 62 provided therefor in the forward end 3 of the chuck body and the housing 4, respectively. The key 60 is free to axially move in slot 61 within the limits defined by the chuck body and by a collar 63 threadedly received on the outer end of the chuck body 1. Thus the housing 4 can move outwardly of the chuck body 1 until the forward end of the key 60 contacts the collar 63.

The operation of the FIG. 6 form is generally similar to that described above with reference to the FIG. 1 form. Rotation of the spindle (not shown) is transferred to the tap T through the clutch drive mechanism effected through the tightening of the adjustment nut 15. When the tap T encounters abnormally high resistance, the clutch drive functions as a torque release whereupon the chuck body 1 rotates relative to the compensating driver 5. When the tap T enters a workpiece faster than the axial feed of the chuck body the spring 51 is compressed to allow relative axial movement of the chuck body 1 and the tap driver 5. Thus, the axial feed rate of the chuck body 1 need not be set to equal the lead of the tap T, but may be less if desired.

It will thus be seen that in both forms of the invention herein, a tap chuck is provided having novel torque release for preventing tool breakage due to torque overload. The invention further provides a novel structure for accommodating relative axial movement between the chuck body 1 and the tool carrying member 5.

Other modes of applying the principle of the invention may be employed, change being made as regards the details described, provided the features stated in any of the following claims or the equivalent of such be employed.

We therefore particularly point out and distinctly claim as our invention:

1. In a chuck, the combination of a chuck body adapted to be mounted on a rotating spindle, a housing axially slidably keyed to said chuck body, tool holding means carried by said housing, means mounting said tool holding means within said housing for relative rotational movement, said mounting means being operative to maintain said tool holding means in coaxial alignment with said housing and to preclude relative axial movement therebetween, and torque transmitting drive means between said housing and tool holding means including juxtaposed driving and driven discs respectively keyed to said housing and tool holding means and spring means urging said discs together into frictional engagement with each other.

2. The combination of claim 1 wherein said spring means comprises a radially slotted, dish-shaped washer, and spring adjustment means are provided for varying the torque load at which said discs will slip thereby to permit relative rotation of said housing and said tool holding means.

3. The combination of claim 1 wherein said driving discs are brass and said driven discs are steel.

4. The combination of claim 1 wherein said mounting means includes an alignment pin the ends of which are disposed in openings provided in said housing and said tool holding means, respectively, said alignment pin being adapted to receive a screw means which extends into and threadedly engages said tool holding means, whereby such coaxial alignment between said housing and tool holding means is maintained.

5. The combination of claim 4 wherein said alignment pin is provided with an integral flange keyed to said tool holding means, said integral flange being disposed between two of said driving discs.

6. In a chuck, the combination of a chuck body including a shank end portion adapted to be mounted in a rotating spindle, a housing disposed within said chuck body, a bushing keyed in said shank portion, a pin extending through openings in said housing and said bushing whereby said housing is keyed to said chuck body for rotation therewith, tool holding means disposed within said housing, releasable clutch drive means for transmitting a predetermined maximum torque from said housing to said tool holding means, said shank portion having oppositely disposed axially elongated slots for accommodating the ends of said pin, and spring assemblies disposed on opposite sides of said bushing, said spring assemblies biasing said bushing and housing to a position whereat said pin is between the ends of said elongated slots to allow relative axial movement between said housing and said chuck body, thus permitting axial feeding movement of said housing and tool holding means at a rate either faster or slower than that of said chuck body.

References Cited by the Examiner

UNITED STATES PATENTS

| | | | |
|---|---|---|---|
| 857,632 | 6/07 | Kihlgren | 10—135 |
| 2,371,330 | 3/45 | Irstad. | |
| 2,405,772 | 8/46 | Adams et al. | 10—135 |

FOREIGN PATENTS 663,102 12/51 Great Britain.

ANDREW R. JUHASZ, *Primary Examiner.*